(12) United States Patent
Batra et al.

(10) Patent No.: US 7,397,870 B2
(45) Date of Patent: Jul. 8, 2008

(54) ULTRA-WIDEBAND (UWB) RECEIVER

(75) Inventors: Anuj Batra, Dallas, TX (US); Anand G. Dabak, Plano, TX (US); Ranjit Gharpurey, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 828 days.

(21) Appl. No.: 10/335,769

(22) Filed: Jan. 2, 2003

(65) Prior Publication Data

US 2003/0227984 A1 Dec. 11, 2003

Related U.S. Application Data

(60) Provisional application No. 60/386,821, filed on Jun. 7, 2002.

(51) Int. Cl.
*H03D 1/00* (2006.01)
(52) U.S. Cl. ..................................... 375/340
(58) Field of Classification Search ................. 375/130, 375/140, 142, 144, 147, 267, 343, 347, 340, 375/316, 350; 455/132
See application file for complete search history.

(56) References Cited

U.S. PATENT DOCUMENTS

| | | | | |
|---|---|---|---|---|
| 6,735,188 | B1* | 5/2004 | Becker et al. | 375/142 |
| 6,842,479 | B2* | 1/2005 | Bottomley | 375/150 |
| 7,042,930 | B2* | 5/2006 | Dafesh | 375/149 |
| 7,058,414 | B1* | 6/2006 | Rofheart et al. | 455/456.4 |
| 7,079,604 | B1* | 7/2006 | Miller et al. | 375/343 |
| 2002/0064245 | A1* | 5/2002 | McCorkle | 375/346 |
| 2002/0191676 | A1* | 12/2002 | O'Hagan | 375/130 |
| 2003/0043887 | A1* | 3/2003 | Hudson | 375/144 |
| 2003/0058927 | A1* | 3/2003 | Douglas et al. | 375/147 |
| 2003/0161411 | A1* | 8/2003 | McCorkle et al. | 375/295 |
| 2003/0227984 | A1* | 12/2003 | Batra et al. | 375/340 |

* cited by examiner

*Primary Examiner*—Khai Tran
(74) *Attorney, Agent, or Firm*—Ronald O. Neerings; Wade J. Brady, III; Frederick J. Telecky, Jr.

(57) ABSTRACT

System and method for maximizing a signal strength of a received signal pulse. A preferred embodiment comprises a self-adjusting correlator/integrator (for example, correlator/integrator 325) that uses no historical timing information. The self-adjusting correlator/integrator uses a plurality of simple correlators/integrators (for example, correlator/integrator 805) which are configured to process a received signal at various times surrounding the signal pulse's expected arrival. A comparator (for example, comparator 820) selects an output of the simple correlators/integrators with greatest magnitude.

8 Claims, 10 Drawing Sheets

ULTRA-WIDEBAND (UWB) RECEIVER

CROSS-REFERENCE TO RELATED APPLICATIONS

This application claims the benefit of U.S. Provisional Application No. 60/386,821, filed on Jun. 7, 2002, entitled "Ultra-Wideband (UWB) Receiver and Transmitter Architecture," which application is hereby incorporated herein by reference.

This application is related to the following and commonly assigned patent applications: Ser. No. 10/335,717, filed Jan. 2, 2003, now U.S. Pat. No. 6,985,532, issued Jan. 10, 2006, entitled "Ultra-Wideband (UWB) Transmitter Architecture;" Ser. No. 10/335,803, filed Jan. 2, 2003, entitled "Rake Receiver Architecture for an Ultra-Wideband (UWB) Receiver;" which applications are hereby incorporated herein by reference.

TECHNICAL FIELD

The present invention relates generally to a system and method for maximizing a received signal's power, and more particularly to a system and method for maximizing the received signal power of an ultra-wideband (UWB) pulse using a simple correlator and integrator.

BACKGROUND

Generally, in a receiver for use in wireless communications systems, it is desirable to maximize the strength of a received signal. Maximizing the received signal strength can enhance the performance of the wireless communications system by permitting reception of the transmitted signal (when the received signal strength is at or near a minimal power level) that would otherwise be not be receivable, and increasing the signal-to-noise ratio to improve the overall system performance (data transfer rate or reducing the error rate) of the wireless communications system.

In an ultra-wideband (UWB) wireless communications system that makes use of a stream of short-duration pulses to encode and convey information, the detection and maximization of the signal power of the pulses are generally important to maximize system performance. To maximize the reception of the short-duration pulses, the receiver generally aligns its detector precisely with each short-duration pulse. By precisely aligning the detector with the arrival of each short-duration pulse, the detector has the ability to detect each short-duration pulse for a maximum period of time, hence increasing the amount of each short-duration pulse received. Even small misalignments can result in significant reductions in signal strength. With more signal from each short-duration pulse received, the receiver is in effect maximizing the strength of the received signal.

Due to the fact that the intervals between each pulse can vary (either on purpose or through error), a method of simply precisely detecting a first pulse (or a first few pulses) and then simply using timing information derived from that first pulse to detect the arrival of subsequent pulses does not, in general, provide good results. The interval drift may be a result of reference clock drift at either the transmitter or the receiver or both. Additionally, this technique does not lend itself to the situation wherein the data conveyed in the stream of short-duration pulses is carried in the difference between the actual arrival time of a short-duration pulse and its expected arrival time.

In an attempt to use the arrival of previously received pulses to predict the arrival of subsequent pulses, the receiver can re-synchronize historical timing information with the time of the arrival of a pulse immediately prior to the arrival of the expected pulse to attempt to precisely align the detector with the pulse. This normally yields better performance than using the timing reference of a pulse that arrived a long time ago, but the problems with reference clock drift can still exist as is the problem with UWB communications systems that use pulse arrival time to convey data.

Additionally, a fairly commonly used pulse shape in UWB wireless communications systems is known as a Gaussian pulse. A Gaussian pulse can be described by a mathematical expression:

$$p(t) = Ke^{-\left(\frac{t}{T_s}\right)^2},$$

where K is a normalization factor and $T_s$ is the Gaussian pulse parameter. While the Gaussian pulses have certain characteristics that favor their use, it can be difficult to create a simple and inexpensive detector to detect Gaussian pulses. To further complicate the issue, the UWB antennas used to transmit and receive the Gaussian pulses may behave like differentiators or integrators (depending upon their implementation) when used in typical UWB frequency ranges. Therefore, the process of detecting the Gaussian pulses (or whatever pulses are being transmitted) is made even more difficult.

One disadvantage of the prior art is that it uses timing information derived from previously arrived pulses to detect the arrival of future pulses. Due to problems associated with clock drift and even modulation schemes that make use of the difference between the actual arrival time of a pulse with its expected arrival time to encode data, the timing information derived from previously arrived pulses may not provide an optimal solution.

A second disadvantage of the prior art is that the attempted detection of the pulse being received results in a detector that is more complex (hence more expensive) than necessary. A simpler design for a detector would result in a lower hardware requirement for the detector and the overall receiver, this will, in turn, result in a less expensive receiver.

SUMMARY OF THE INVENTION

These and other problems are generally solved or circumvented, and technical advantages are generally achieved, by preferred embodiments of the present invention which provide an UWB receiver that is capable of self-adjusting its signal detector to maximize a signal strength of the received signal, without using historical timing information that can be incorrect. Additionally, the UWB receiver's signal detector is a simple implementation that can be readily realized in a low-cost receiver that is capable of operating with a wide variety of signal modulation schemes and pulse shapes without requiring significant modifications.

In accordance with a preferred embodiment of the present invention, a correlator/integrator comprising a signal input, a first signal path coupled to the signal input, wherein the first signal path is controlled by a first switch, the first signal path to conduct a first signal from the signal input, a second signal path coupled to the signal input, wherein the second signal path is controlled by a second switch, the second signal path to conduct a second signal from the signal input, a capacitor coupled to the first and second signal paths, the capacitor to accumulate a charge when either signal is conducted to the capacitor, and wherein the first signal and the second signals have opposite polarity.

In accordance with another preferred embodiment of the present invention, a method for received signal strength maximization comprising setting a first correlator/integrator to start operation at a first time, wherein the first correlator/integrator produces an output dependent upon a timing match between the first time and a received signal, setting a second correlator/integrator to start operation at a second time, wherein the second correlator/integrator produces an output dependent upon a timing match between the second time and the received signal, setting a third correlator/integrator to start operation at a third time, wherein the third correlator/integrator produces an output dependent upon a timing match between the third time and the received signal, comparing an output from each of the first, second, and third correlators/integrators, and selecting a largest output.

In accordance with another preferred embodiment of the present invention, a self-adjusting pulse detector comprising a signal input to provide a signal, a plurality of correlators/integrators coupled to the signal input, each correlator/integrator containing circuitry to correlate a signal from the signal input with a desired signal and to create a value based on the correlation, wherein each correlator/integrator is configured to commence operation at a different time, and a comparator having a plurality of inputs, with each input coupled to an output from each of the plurality of correlators/integrators, the comparator to select a maximum output from the plurality of inputs.

In accordance with another preferred embodiment of the present invention, an ultra-wideband (UWB) receiver comprising a signal input, a filter and amplifier unit (FAU) coupled to the signal input, the FAU containing circuitry to eliminate interferers and amplify a signal provided by the signal input to an specified magnitude, a self-adjusting pulse detector coupled to the FAU, the self-adjusting correlator/integrator containing circuitry to maximize a signal strength of an output provided by the FAU, and a baseband processor coupled to the self-adjusting correlator/integrator, the baseband processor containing circuitry to equalize and decode a data stream provided by the self-adjusting correlator/integrator.

An advantage of a preferred embodiment of the present invention is that historical information is not needed to derive timing information to accurately detect the arrival of a received pulse. Therefore, no information needs to be stored nor is there any chance of the information being incorrect. Incorrect timing information may result in a poorly performing wireless communications system.

A further advantage of a preferred embodiment of the present invention is that the detection of a received pulse is self-adjusting. This means that if for a particular received pulse the detection was not optimal, the poor detection of that particular pulse will not affect the detection of subsequent pulses.

Yet another advantage of a preferred embodiment of the present invention is that the design for the detector is simple, resulting in very low hardware requirements. This yields a low cost receiver.

A further advantage of a preferred embodiment of the present invention is that the detector can be used for practically any modulation scheme and pulse shape being transmitted. Should the designers decide to change the modulation scheme used or the pulse being transmitted, minor tweaks to a few registers or memory locations would be sufficient to modify the detector to operate with the new pulse shape.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an UWB wireless communications system using Gaussian pulses and a bi-phase modulation scheme. The invention may also be applied, however, to other UWB wireless communications systems using any modulation scheme and any pulse shape.

Figure 1:
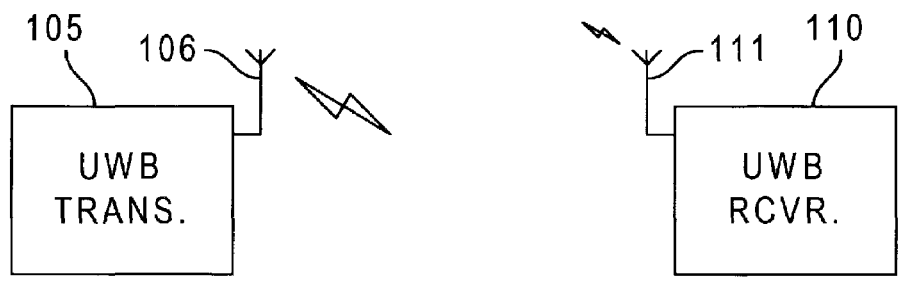
FIG. 1 is a diagram of an exemplary ultra-wideband (UWB) wireless communications system.

With reference now to FIG. 1, there is shown an exemplary ultra-wideband (UWB) wireless communications system. The UWB wireless communications system as displayed includes an UWB transmitter 105 and an UWB receiver 110. Note that while the UWB wireless communications system is illustrated with a single receiver, there can be and typically are more than one receiver in a single wireless communications system.

A majority of UWB communications systems use streams of short duration pulses to encode and transmit data, although in the strictest sense, any wireless communications system is classified as an UWB communications system if the bandwidth of the signal being transmitted, $f_B$, is greater than or equal to $0.20 f_c$, where $f_c$ is the center frequency of the signal being transmitted. Additionally, the UWB communications system should have a minimum bandwidth of 500 MHz. Therefore, other data encoding and transmission methodologies can be employed by UWB communications systems.

Figure 2A:
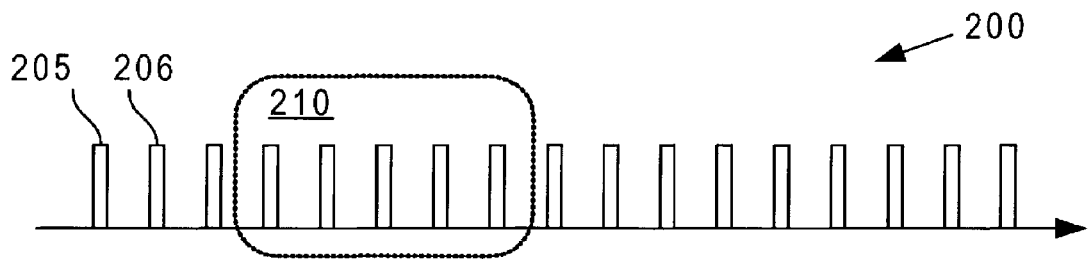
FIGS. 2a-2d are diagrams of an exemplary stream of short duration pulses and several modulation schemes for the streams.

With reference now to FIG. 2a, there is shown an exemplary pulse stream 200, wherein the pulses are of short duration. The exemplary pulse stream 200 may be an output of an UWB transmitter which is part of an UWB communications system. The exemplary pulse stream 200 is made up of a series of short duration pulses, for example, pulses 205 and 206. Prior to being modulated, the pulses 205 and 206 are essentially identical (or as close to being identical as possible). A group of pulses 210 is highlighted to illustrate several commonly used modulation techniques. Note that although the pulses, for example, pulses 205 and 206, are illustrated as being essentially square in shape, in practice, pulses of a variety of different shapes, for example, Gaussian pulses, may actually be preferred over the square pulses due to difficulties in generating square pulses.

Figure 2B:
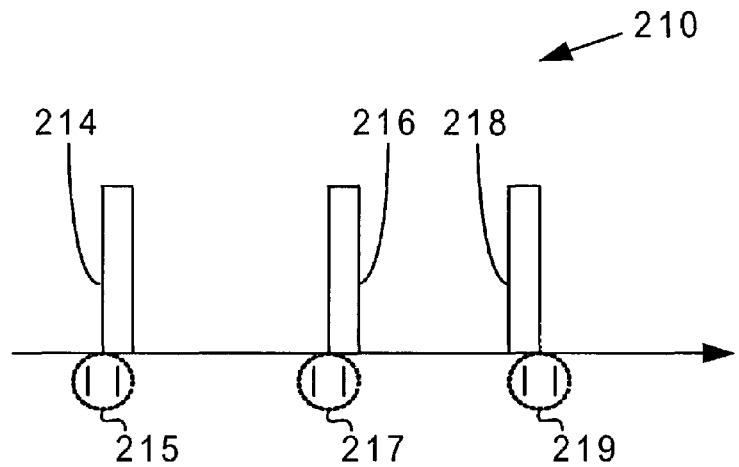

With reference now to FIG. 2b, there is shown the group of pulses 210, wherein the pulses are modulated using pulse position modulation (PPM), with time increasing towards the right. PPM varies the position of the pulses in order to encode the data. For example, three pulses 214, 216, and 218 can be used to illustrate PPM. The first pulse 214 appears slightly delayed of where it is expected to appear, as indicated by highlight 215. The second pulse 216 is slightly delayed and appears a small amount of time after when it was expected to appear, as shown by highlight 217. Finally, the third pulse 218 is slightly advanced and appears a small amount of time prior to when it was expected to appear, as shown by highlight 217. PPM uses either the advanced or delayed appearance of a pulse with respect to its expected appearance to convey data.

Figure 2C:
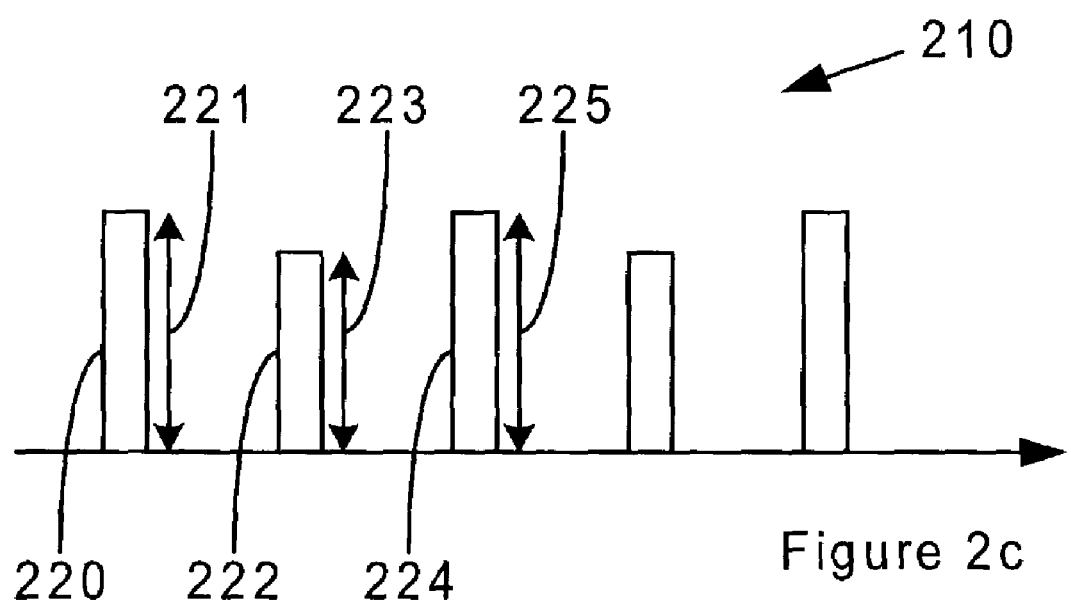

With reference now to FIG. 2c, there is shown the group of pulses 210, wherein the pulses are modulated using pulse amplitude modulation (PAM). PAM varies the amplitudes of the pulses to encode the data while leaving the positions of the pulses untouched. For example, pulses 220 and 222 vary in amplitude from each other, as indicated by markers 221 and 223. While pulse 224 has the sample amplitude as the pulse 220.

Figure 2D:
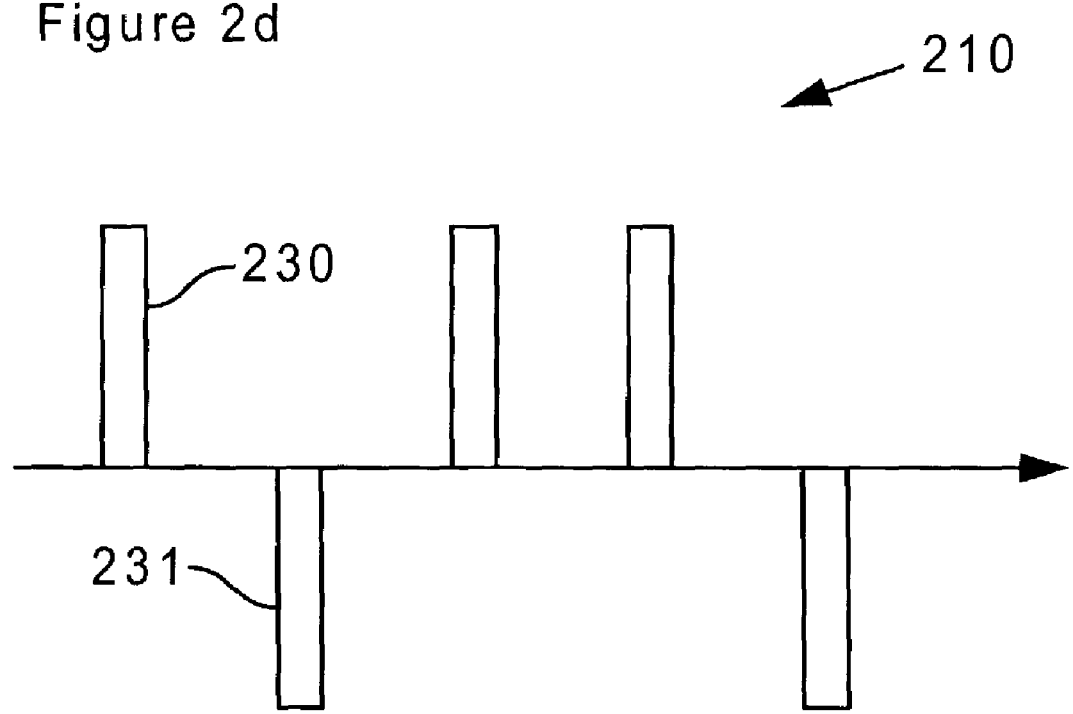

With reference now to FIG. 2d, there is shown the group of pulses 210, wherein the pulses are modulated using bi-phase modulation. FIG. 2d illustrates a case where the phase is varied one of two ways, zero (0) degrees or 180 degrees. For example, a first pulse 230 is at zero degrees, while a second pulse 231 is at 180 degrees.

Note that FIGS. 2b through 2d illustrate several different modulation schemes that are commonly used in UWB communications systems that use pulse streams to transmit information. Other modulation schemes may be used.

Figure 3:
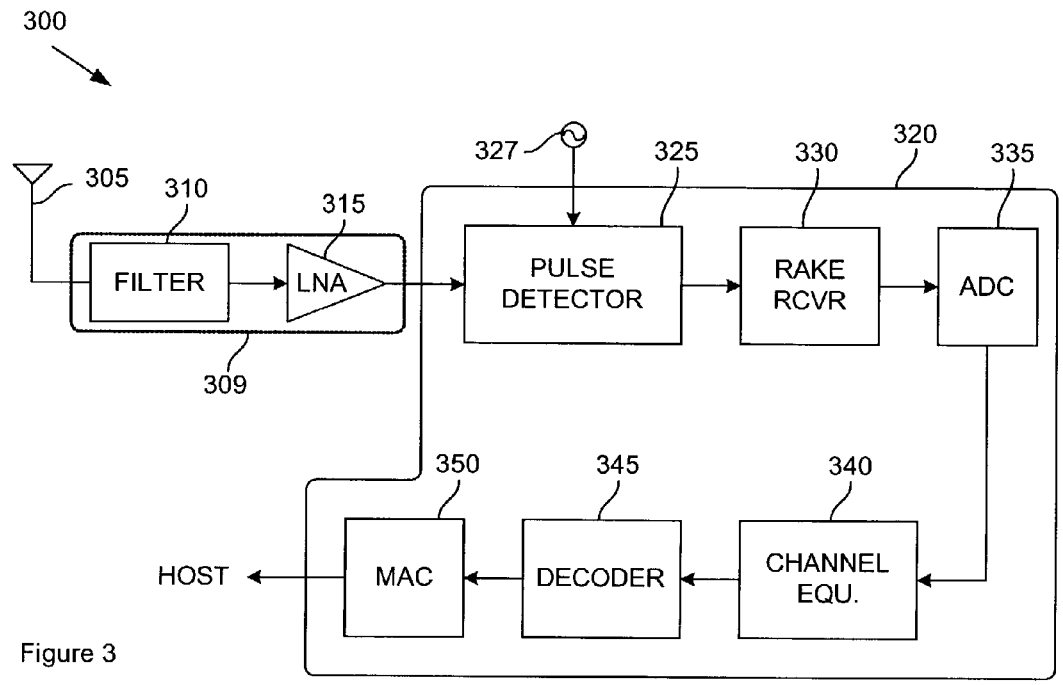
FIG. 3 is a diagram of an exemplary UWB receiver with a received signal detector, according to a preferred embodiment of the present invention.

With reference now to FIG. 3, there is shown a block diagram of an exemplary UWB receiver 300 with a received signal detector according to a preferred embodiment of the present invention. The UWB receiver 300 is displayed partitioned into three major parts; an antenna 305, a high-speed filter and amplifier unit (HFA) 309, and a signal processing unit 320. With the exception of the antenna 30, the UWB receiver 300 can be fabricated on a single integrated circuit.

The HFA 309 includes a filter unit 310 and a low-noise amplifier (LNA) 315. The filter unit 310 is used to eliminate any out-of-band and in-band interference. For example, the filter unit 310 can be used to ensure that only signals within the UWB receiver's frequency band of interest progresses further into the UWB receiver 300. The filter unit 310 may also include an adaptive notch filter (not shown) that can be adjusted to eliminate interference that may be inside the UWB receiver's frequency band of interest. For example, if there are other wireless networks operating within the area of the UWB receiver 300, the filter unit 310 can adjust its notch filter to eliminate parts (frequency ranges) of its received signal that contain transmissions from the other wireless networks.

The signal processing unit 320 includes a pulse detector 325, a rake receiver 330, an analog-to-digital converter (ADC) 335, a channel equalizer 340, a decoder 345, and a media access control (MAC) 350. Note that depending on a particular implementation, one or more of the above listed components of the signal processing unit 320 may not be present. For example, the MAC 350 may be placed in a different portion of the UWB receiver 300 or it may not be present at all.

The following are brief descriptions of the functions of the various components of the signal processing unit 320. Certain components will be discussed in greater detail below. The pulse detector 325 is used to detect the reception of the short-duration pulses and to create a value that corresponds to the strength of the received pulse. Previously, the term pulse detector was used to describe a circuit that detects the arrival of a received pulse. Note that the term detector and correlator may be used interchangeably. However, the pulse detector 325 includes a correlator and an integrator. The integrator is used to convert the signal detected by the correlator into a value, normally a voltage or charge that is dependent on the magnitude of the signal. In some implementations, the correlator and the integrator are one in the same and often no clear line of demarcation is drawn between the two.

The rake receiver 330 is used to combine reflections of the received pulse arriving at the receiver at different times (this is commonly referred to as multipath). The ADC 335 converts the value created by the correlator/integrator 325 into a digital sample that can be processed by the remainder of the signal processing unit 320. The channel equalizer 340 is used to adjust (flatten) the frequency response of the received signal (pulse) and the decoder 345 is used to extract information that is encoded into the pulses. Finally, a MAC 350 manages and maintains communications to and from a host device coupled to the UWB receiver 300.

As discussed earlier, a Gaussian pulse is a commonly used short-duration pulse in the streams of short-duration pulses used by many UWB communications systems. Gaussian pulses have a distinct advantage over many other short-duration pulses in that the product of time and bandwidth of the Gaussian pulse is a-constant.

Figure 4A:
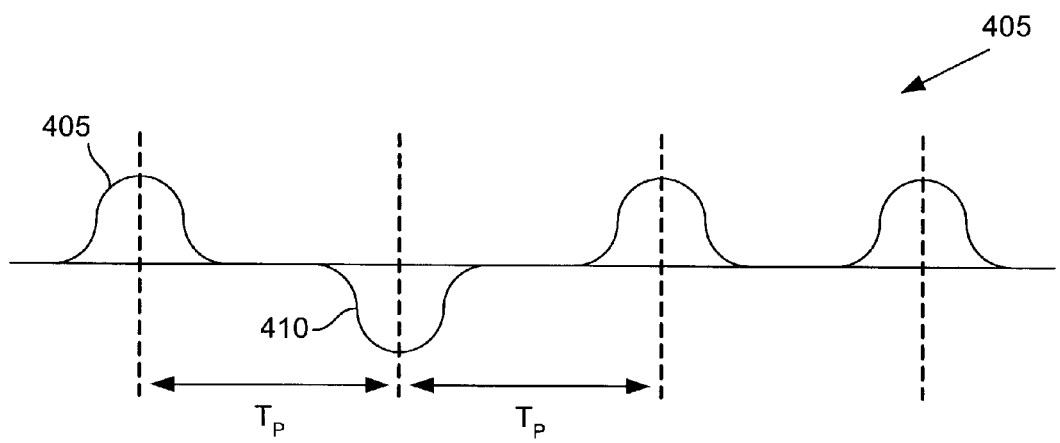
FIGS. 4a and 4b are diagrams of a stream of short duration pulses wherein the pulses are Gaussian pulses and a close-up view of a Gaussian pulse, according to a preferred embodiment of the present invention.
Figure 4B:
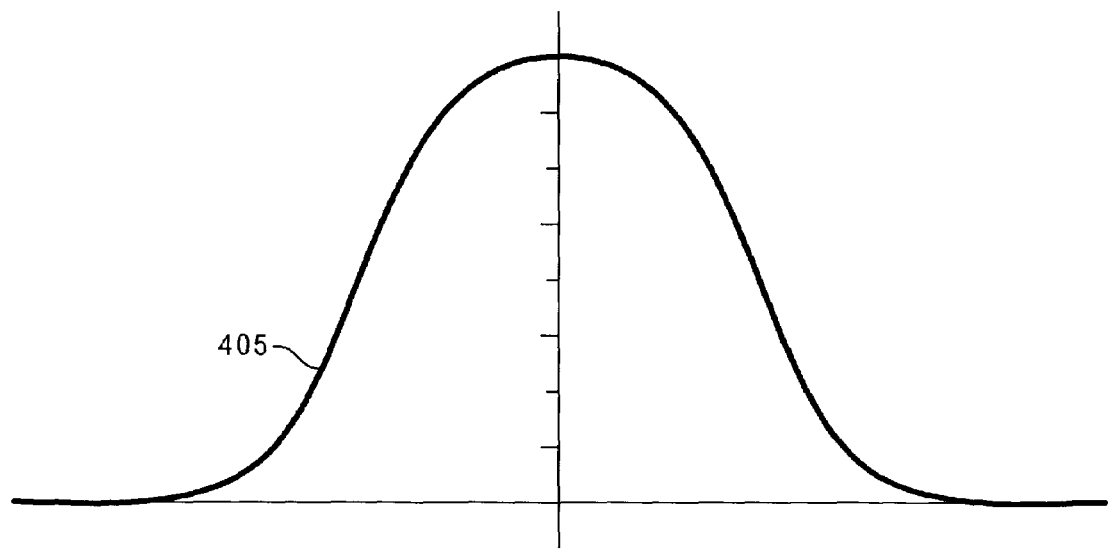

With reference now to FIGS. 4a and 4b, there is shown a stream of short duration pulses 400 and a close-up view of an exemplary analog Gaussian pulse 405, wherein the pulses in the stream of short duration pulses are Gaussian pulses and the stream is modulated using bi-phase modulation according to a preferred embodiment of the present invention. When using bi-phase modulation, the polarity of the pulses is used to transmit the value of the data bit. For example, in the stream 400, three of the pulses (for example, one of the three pulses may be pulse 405) have the same polarity, hence the three data bits represented by the pulses have the same value. A different pulse 410 has a reversed polarity, indicating that the data bit that it represents has a different value. Notice that the inter-pulse spacing, Tp, is constant for each pulse, since bi-phase modulation does not adjust the inter-pulse spacing.

In an UWB communications system, the antennas used to transmit and receive the signals, for example, the antenna 305 (FIG. 3), would typically have sufficient bandwidth to transmit and receive the UWB signals. Depending on how the antennas are implemented they can behave as differentiators or integrators. For example, if an antenna is designed as a constant gain antenna, then it will behave as an integrator and if an antenna is designed as a constant effective aperture, then it will behave as a differentiator.

The following discussion will be based on an UWB communications system with antennas that are designed as-constant effective aperture antennas, therefore the antennas operate as differentiators. Note that the present invention can be trivially modified to accommodate different antenna design types. When an UWB communications system uses antennas that behave as differentiators, a Gaussian pulse that is transmitted by a first antenna and then received by a second antenna would have undergone two first differentials, and the signal at the receiver will actually be a second differential of the original Gaussian pulse. Therefore, a Gaussian pulse (or any other pulse for that matter) that is transmitted (and/or received) by an antenna will no longer appear to be a Gaussian pulse. This phenomenon is widely known by those of ordinary skill in the art of the present invention.

If an UWB communications system were being used with antennas that behave as integrators, then the UWB communications system can be modified to transmit the fourth differentials of a Gaussian pulse rather than a Gaussian pulse, then the UWB receiver will receive a third differential of a Gaussian pulse and after the receive antenna, the received pulse would appear to be a second differential of a Gaussian pulse. Alternatively a pulse detection circuit in the receiver can be modified to receive a different type of pulse.

Figure 5:
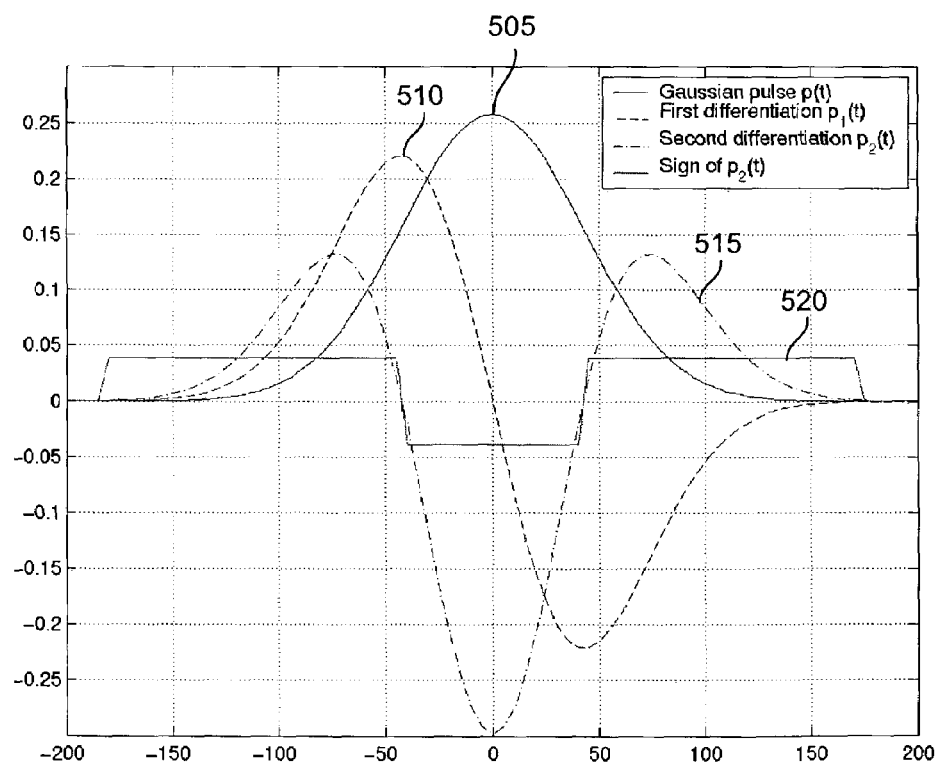
FIG. 5 is a data plot of an exemplary Gaussian pulse along with the Gaussian pulse's first and second derivative, and a sign curve of the second derivative, according to a preferred embodiment of the present invention.

With reference now to FIG. 5, there is shown a data plot diagram of an exemplary Gaussian pulse 505 along with its first and second differentials (510 and 515) of the Gaussian pulse 505 according to a preferred embodiment of the present invention. Note that the Gaussian pulse 505 displayed is a representative of the plurality of Gaussian pulses in a stream of short-duration pulses used in an UWB communications system, and that each of the plurality of Gaussian pulses will appear essentially identical to the Gaussian pulse 505 with exception given to perhaps their polarity and/or magnitude (this varies depending upon the particular modulation technique used by the UWB communications system being examined).

The curve 510 represents the first differential of the Gaussian pulse 505 (hereunder referred to as the first differential curve 510) and displays the slope of the Gaussian pulse 505. For example, at an apex of the Gaussian pulse 505, where the slope goes from a positive value to a negative value, the first differential curve 510 transitions across a zero value line. The curve 515 represents the second differential of the Gaussian pulse 505 (hereunder referred to as the second differential curve 515) and displays the-rate of change in the slope of the Gaussian pulse 505 (or the slope of the first differential curve 510). For example, at the tail ends of the Gaussian pulse 505, when the curve slowly rises, the second differential curve 515 has a small value, indicating a slowly changing slope.

Note that the second differential curve 515, which represents what an UWB receiver would receive for each Gaussian pulse if an UWB transmitter transmits a stream of short-duration Gaussian pulses, can be difficult to detect. The detection difficulty lies mainly in the detection of the subtle curves of the second differential curve 515. A detector that is capable of rapidly detecting the receipt of the second differential curve 515 would likely be complex and expensive.

A fourth curve 520 displayed in FIG. 5 represents the sign of the second differential curve 515 and will be referred to as the sign curve 520. The sign curve 520 is positive when the sign (or polarity) of the second differential curve 515 is positive and negative when the sign of the second differential curve 515 is negative. The sign curve 520 has the appearance of a simple rectangular wave and is easier to detect with a simple detector. Note that if the UWB communications system is using bi-phase modulation, then some of the Gaussian pulses in the stream of short-duration pulses will have a negative polarity. If this is the case, then sign curves that correspond to the negative polarity Gaussian pulses will appear as complements of the sign curve 520.

The detection of occurrences of sign curves, such as the sign curve 520, can be performed through the use of match filters. Match filters use switched capacitors to integrate a current into a charge. The charge is accumulated on the switched capacitors themselves. When there is a greater "match," then the charge accumulated on the switched capacitor is greater. In the case of detecting sign curves, the match filters can be referred to as signed match filters since the matched filters are more interested in matching the signs of the curves then the curves themselves. Match filters and signed match filters are well understood by those of ordinary skill in the art of the present invention.

Figure 6:
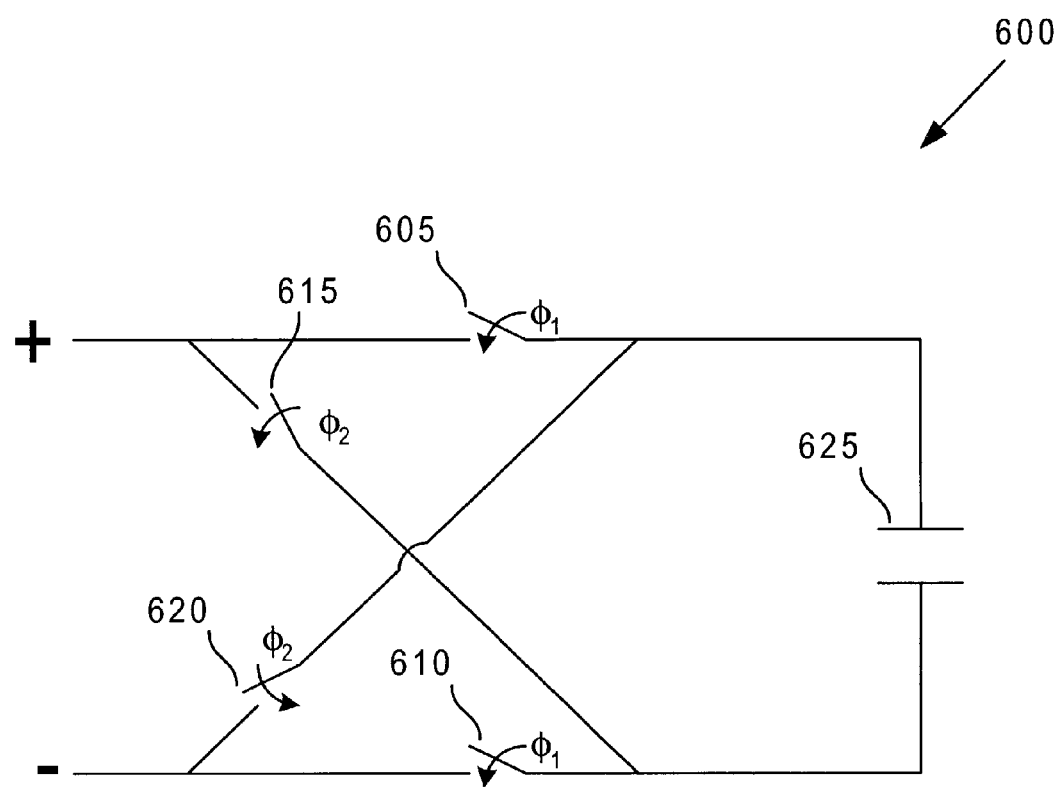
FIG. 6 is a diagram of a signed match filter that is used in correlating and integrating transmitted signals, according to a preferred embodiment of the present invention.

With reference now to FIG. 6, there is shown a block diagram of a signed match filter 600 for use in detecting transmitted signals, according to a preferred embodiment of the present invention. Note that the signed match filter 600, as displayed in FIG. 6, can be used in place of the pulse detector 325 (FIG. 3), or a portion of the pulse detector 325, depending on the modulation scheme used. The signed match filter 600 is made up of a plurality of switches 605, 610, 615, and 620 and a capacitor 625. The switches are controlled by control signals that open and close the switches and the capacitor 625 accumulates a charge whenever there is a voltage difference across the capacitor 625.

The signed match filter 600, as illustrated in FIG. 6, operates with differential mode signals. Differential mode signals are carried on two separate conductors and the actual signal is the difference of the signal carried on the two conductors. Note that the signed match filter 600 can be readily modified to operate with single ended signals.

The switches operate in pairs, with a first pair (switches 605 and 610) being controlled by a first control signal, $\phi_1$ and a second pair (switches 615 and 620) being controlled by a second control signal, $\phi_2$. According to a preferred embodiment of the present invention, the control signals are active high (although the control signals and switches can also be configured to operate active low), therefore, whenever one of the two control signals is high, the switches controlled by the particular control signal are closed and current may flow. Note that if there is no signal being received while the switches are closed, then no (or very little) current flows.

With reference back to FIG. 5, note that the signed curve 520 has portions when it is a positive value and portions when it is a negative value. When a capacitor (such as capacitor 625 (FIG. 6)) accumulates a charge due to a negative current, the net charge on the capacitor decreases. If the capacitor is permitted to accumulate a negative current, then the net charge on the capacitor would decrease. This can result in a decrease in the overall signal strength detected by the signed match filter 600 (FIG. 6).

With reference back to FIG. 6, notice that the second pair of switches 615 and 620 are arranged in a cross-wised fashion. Therefore, when the second control signal, $\phi_2$, becomes high, the conductors that are connected to the capacitor 625 are reversed. This has a net effect of reversing the polarity of the received signal. Hence, a signal with negative polarity will become positive and vice versa.

When portions of the expected received signal become negative, the second pair of switches 615 and 620 can be activated (along with the de-activation of the first pair of switches 605 and 610) to permit the reversing of the polarity of the negative portions of the expected received signal. Hence, if the detector is properly aligned with the received signal, the negative portion of the received signal becomes positive and the accumulated charge on the capacitor 625 is increased.

Notice that the signed match filter 600 can be readily adapted for use with a wide variety of different pulses. In order to adapt the signed match filter 600 to other pulses, timing information that specifies the expected behavior of the pulse is needed to control the behavior of the first and second control signals. Examples of the information needed for the timing information include the duration of the pulse, when (and if) the pulse changes polarity, the duration of the various times when the pulse changes polarity, etc. An example of the first and second control signals for the second derivative of a positive polarity Gaussian pulse is provided below.

Figure 7:
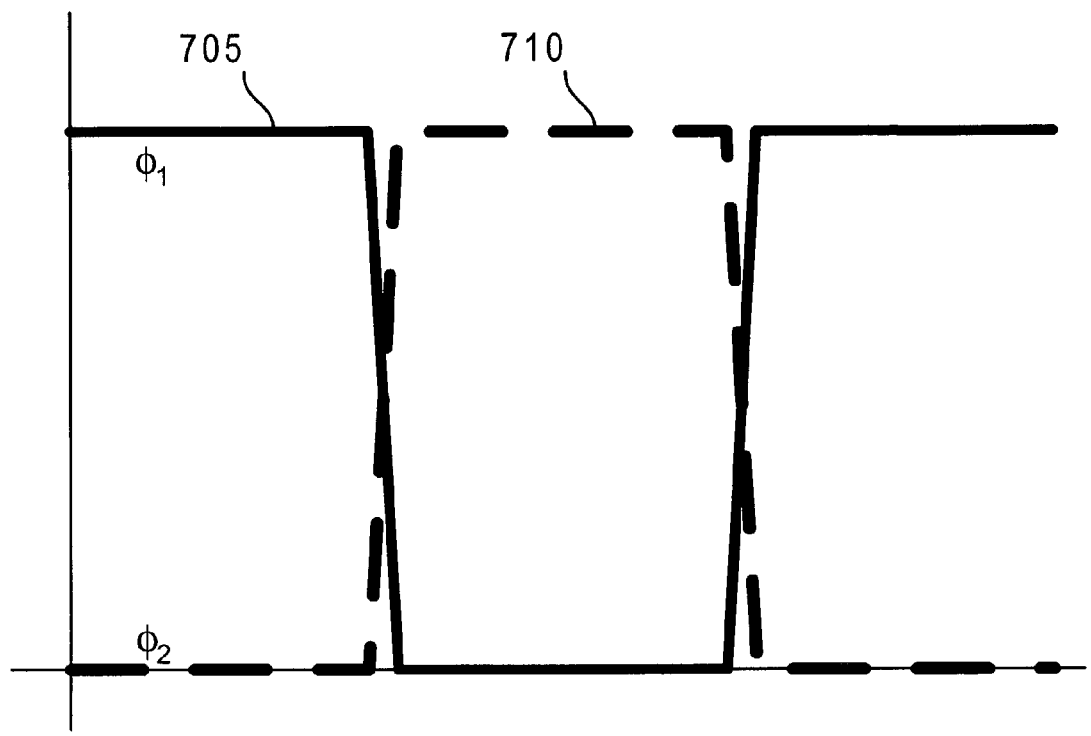
FIG. 7 is a diagram of a pair of control signals used to control the operation of a signed match filter, according to a preferred embodiment of the present invention.

With reference now to FIG. 7, there is shown a diagram illustrating the first and second control signals for the signed match filter 600 displayed in FIG. 6, according to a preferred embodiment of the present invention. A first curve 705 displays the first control signal, $\phi_1$, and a second curve 710 displays the second control signal, $\phi_2$. Note that the two control signals are mutually exclusive, meaning that when one control signal is active, the other control signal is inactive and vice versa. Never should both control signals be active simultaneously. Note also that since the received signal can a periodic sequence of pulses, the control signals themselves may be periodic. For example, the first curve 705 (control signal $\phi_1$) would repeatedly cycle from states High->Low->High->High->Low->High and so on.

If the received signal being detected is of a different profile or shape, the control signals can be modified to meet the profile of the received signal. For example, if the received signal is simply a square wave, then a single control signal may be sufficient to control the signed match filter 600 (FIG. 6), with the particular control signal being active dependant upon the polarity of the received signal. Of course, more complex received signals may necessary require a more complex set of control signals, with more transitions, etc.

According to a preferred embodiment of the present invention, no historical timing information is used in the detection of the received signal. However, since the information conveyed in the streams of short-duration pulses in an UWB communications system is via the pulses themselves, there is an expected arrival time for each pulse in the stream. By setting the expected arrival time of each pulse to be an "on-time" arrival, a signed match filter being used as a pulse detector (for example, the pulse detector 325 (FIG. 3)) will correlated and integrate whatever signal the UWB receiver 300 (FIG. 3) receives at the expected arrival time of each pulse. The UWB receiver 300 may receive exactly the pulse, a portion of the pulse, or no portion of the pulse during the "on-time" arrival.

In an attempt to maximize the signal strength of the received pulse should the received pulse be slightly delayed or advanced, additional signed match filters are set to correlate and integrate whatever the UWB receiver receives a small period of time "earlier" and "later" than the expected arrival time of each pulse. The "earlier" timing is referred to as "early" timing, while the "later" timing is referred to as "late" timing.

Figure 8:
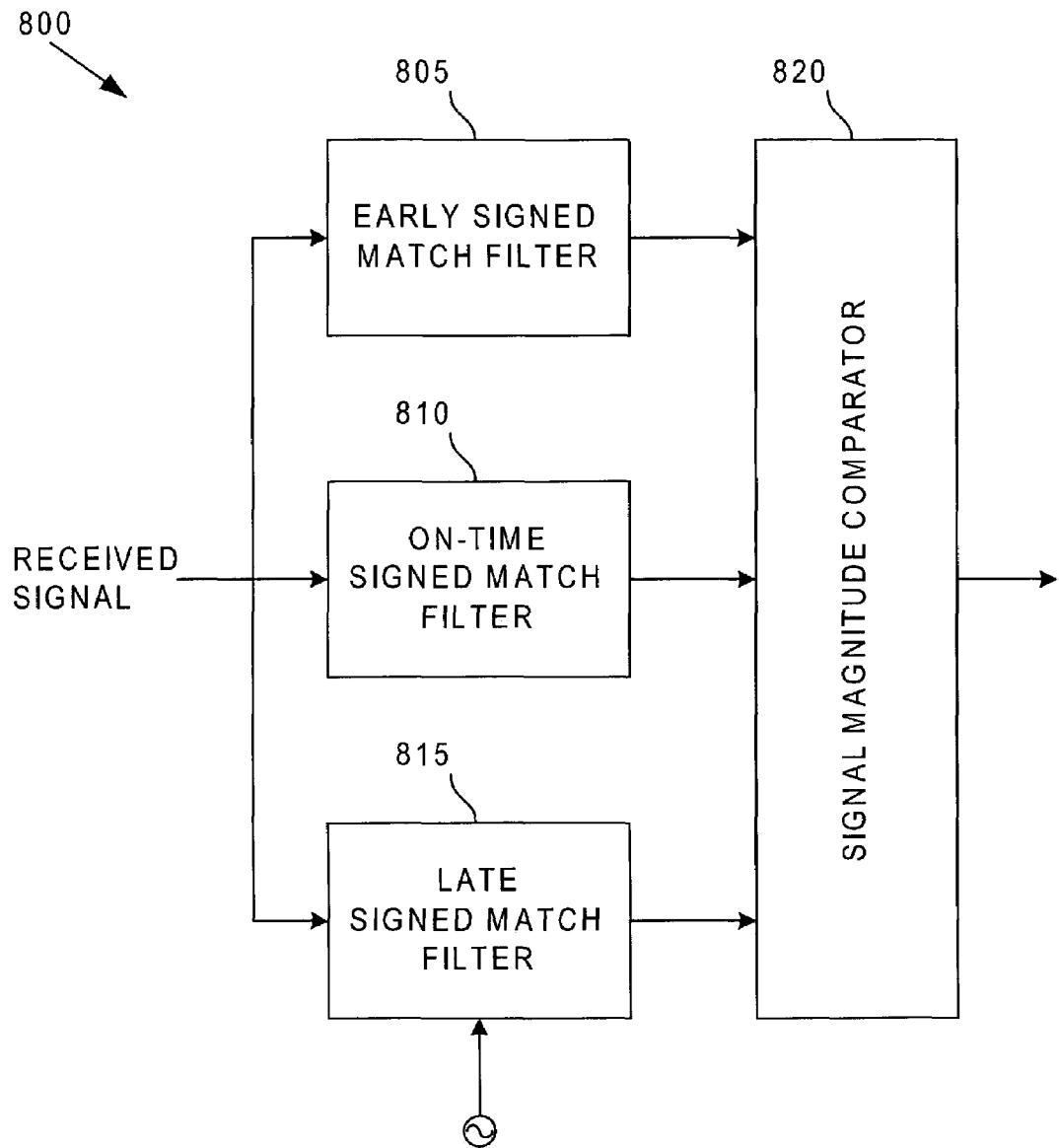
FIG. 8 is a diagram of a pulse detector with a self-adjusting timing mechanism to maximize received signal strength, according to a preferred embodiment of the present invention.

With reference now to FIG. 8, there is shown a block diagram illustrating a pulse detector 800 with a self-adjusting timing mechanism to maximize received signal strength, according to a preferred embodiment of the present invention. The pulse detector 800 with a self-adjusting timing mechanism includes a plurality of correlators/integrators (805, 810, and 815), wherein each correlator/integrator is configured to correlate and integrate the received signal at slightly different times. For example, in the pulse detector 800, there are three correlators/integrators: an early correlator/integrator 805 performs its functions a fraction of a pulse width prior to an on-time correlator/integrator 810, which in turn, performs its functions a fraction of a pulse width prior to a late correlator/integrator 815. Note that the timing difference between the early and on-time correlators/integrators does not necessarily need to be the same as the timing difference between the on-time and late correlators/integrators, although it is preferred. It is also preferred that the timing difference be approximately-one-half of the duration of the pulse being detected.

The pulse detector 800 is displayed with three correlators/integrators 805, 810, and 815. Three offers a good compromise between performance and hardware complexity. A pulse detector with a larger number of signed match filters can be built, but any performance gain may be offset by the additional hardware requirements. Additionally, a maximum number of correlators/integrators may be limited by the spacing between the pulses, the width of the pulses, and the timing difference between the individual correlators/integrators. A pulse detector with two correlators/integrators may also be built. However, two correlators may not be able span both sides of an expected arrival time (given that one correlator/integrator is set to operate at the expected arrival time) and miss the pulse if the pulse is either early or late and the second correlator/integrator was set to operate late (or early).

Each one of the early, on-time, and late correlators/integrators 805, 810, and 815 will generate a value that corresponds to what was received by the UWB receiver while it was active. This value is a charge accumulated on a capacitor (for example, capacitor 625 (FIG. 6)) and the magnitude of the charge is dependent upon how closely the actual received pulse matches up with the timing of the individual correlators/integrators 805, 810, 815. Notice that each one of the early, on-time, and late correlators/integrators 805, 810, and 815 receives its signal from the same received signal input and that it is only the timing of when their respective switches and capacitors become active that differs between the three. According to a preferred embodiment of the present invention, the charge that is accumulated on a capacitor (for example, capacitor 625 (FIG. 6)) that is present in the early, on-time, and late correlators/integrators 805, 810, and 815 are reset prior to their being reused for the next incoming pulse.

The pulse detector 800 also includes a signal magnitude comparator 820. The signal magnitude comparator 820 has as its inputs the outputs of the early, on-time, and late correlators/integrators 805, 810, and 815 respectively. The signal magnitude comparator 820 then selects the input with the greatest magnitude and produces that magnitude at its output. Should multiple magnitudes be equal to the maximum value, the signal magnitude comparator 820 will arbitrarily select a value to produce at its output or it may be set to select a specific one out of the multiple magnitudes with equal value.

Figure 9A:
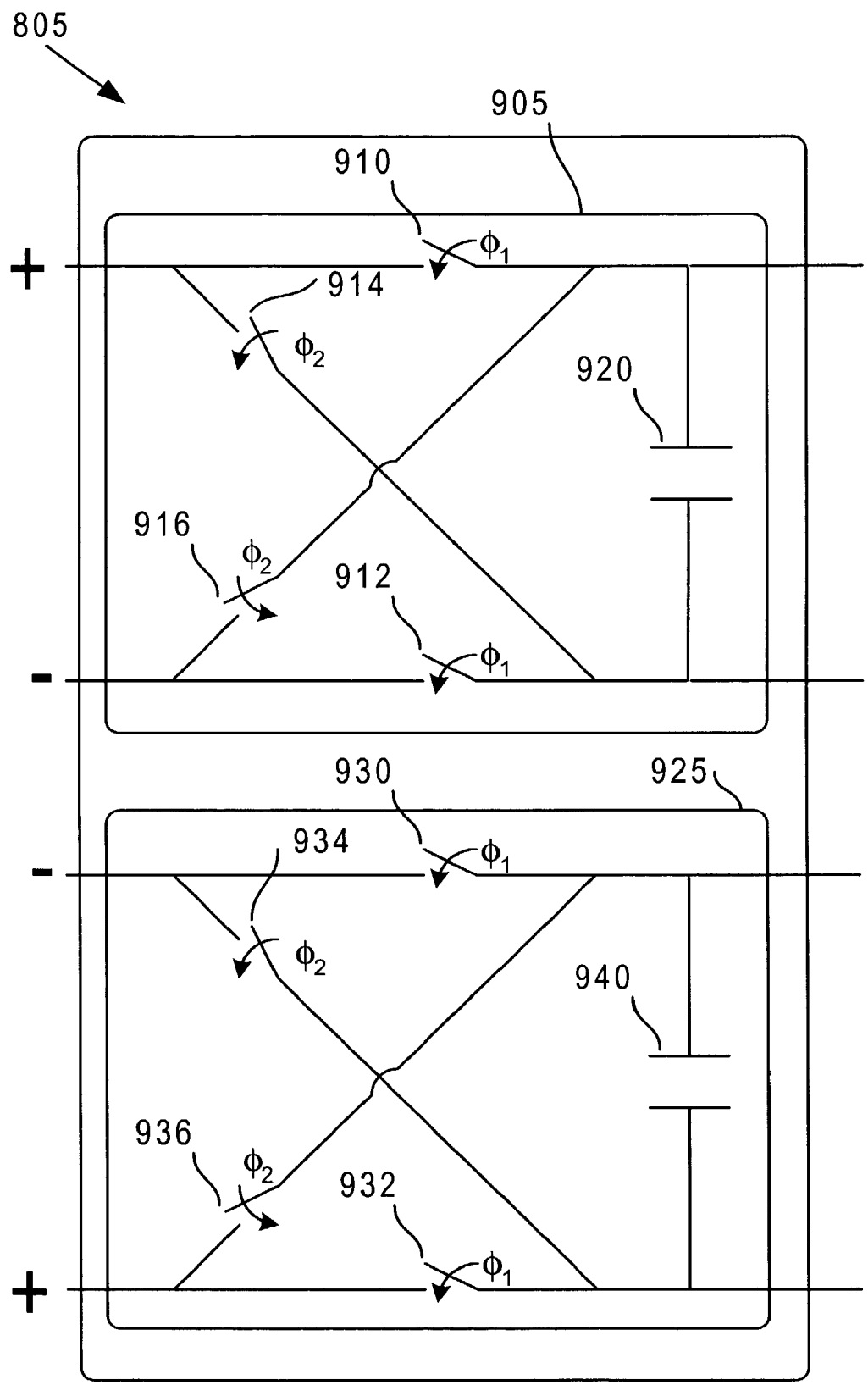
FIGS. 9a and 9b are diagrams of detailed and block views of an exemplary correlator/integrator wherein the correlator/integrator is operable with both positive and negative polarity pulses, according to a preferred embodiment of the present invention.

With reference now to FIG. 9a, there is shown a block diagram illustrating a detailed view of a portion of an exemplary correlator/integrator, for example, the early correlator/integrator 805 (FIG. 8), wherein the correlator/integrator is operable with both positive and negative polarity pulses, according to a preferred embodiment of the present invention. Depending on the modulation scheme used to convey data onto the stream of short-duration pulses, some of the pulses may have a reversed polarity. This is the case when the pulses are modulated using bi-phased modulation. In order to accurately detect the pulses with reversed polarity, two signed match filters 905 and 925 can be used. The first signed match filter 905 is used to correlate and integrate pulses of one polarity while the second signed match filter 925 is used to correlate and integrate pulses of a reversed polarity. When a negatively polarized pulse is correlated and integrated by a signed match filter not specifically configured for negative pulses, the resulting charge will likely be low (if not zero) due to the negative current actually depleting any charge stored on the capacitor, even if the timing of the signed match filter and the negatively polarized pulse is correct.

According to a preferred embodiment of the present invention, the first and the second signed match filters 905 and 925 are essentially identical with the exception of a reversal of the inputs to one of the signed match filters. Both signed match filters are controlled by identical control signals and the capacitors 920 and 940 used to accumulate a charge should be as close to identical in capacitance as possible. The reversal of the inputs to one of the two signed match filters, for example, the second-signed match filter 925, permits the second signed match filter 925 to reverse the polarity of the pulses it is correlating and integrating. Therefore, it is ensured that one of the two signed match filters is correlating and integrating a properly polarized pulse.

Figure 9B:
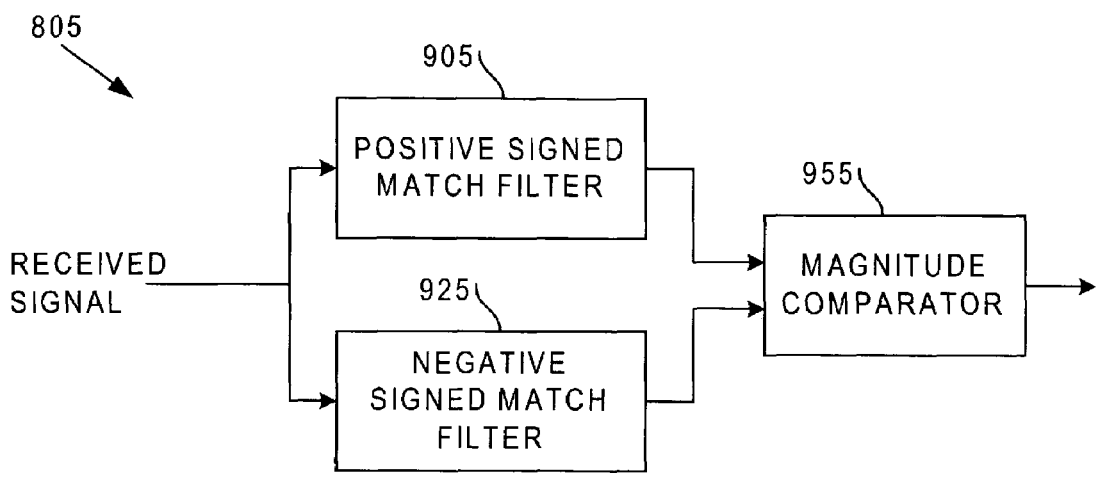

With reference now to FIG. 9b, there is shown a block diagram illustrating a complete view of an exemplary correlator/integrator, for example, the early correlator/integrator 805 (FIG. 8), wherein the correlator/integrator is operable with both positive and negative polarity pulses, according to a preferred embodiment of the present invention. FIG. 9b illustrates the first and the second correlators/integrators 905 and 925, herein identified as the positive correlator/integrator 905 and the negative correlator/integrator 925. After the two correlators/integrators 905 and 925 produce their respective values, a magnitude comparator 955 is used to compare the two values and select the larger of the two values to produce at its output. Due to the configuration of the positive and negative correlators/integrators 905 and 925, it is not likely for the two values produced by the two to be equal, unless there is no signal being received by the UWB receiver.

Figure 10:
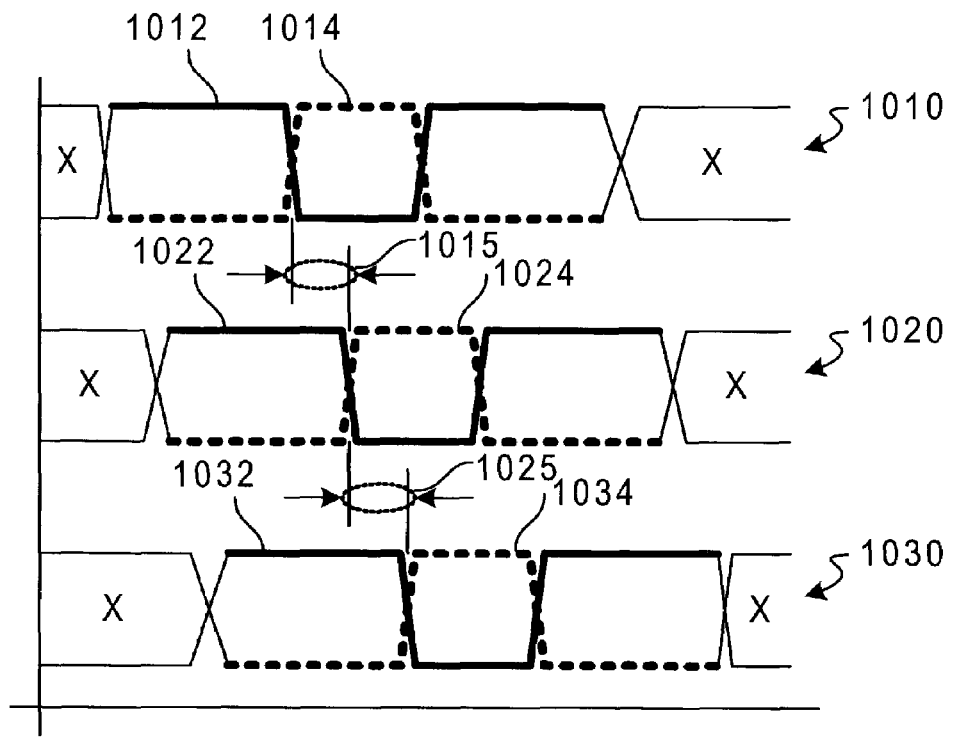
FIG. 10 is a timing diagram of the control signals for early, on-time, and late correlators/integrators, according to a preferred embodiment of the present invention.

With reference now to FIG. 10, there is shown a timing diagram illustrating the timing of the control signals for the early, on-time, and late correlators/integrators (for example, correlators/integrators 805, 810, and 815 (FIG. 8)), according to a preferred embodiment of the present invention. There are displayed three sets of control signals 1010, 1020, and 1030. The first set 1010 corresponds to the early correlator/integrator-while the second and third sets 1020 and 1030 correspond to the on-time and late correlators/integrators, respectively. Examining the first set 1010 in closer detail, it is evident that there are two control signals illustrated. There is a first control signal, $\phi_1$, 1012, and a second control signal, $\phi_2$, 1014. The second and third sets 1020 and 1030 are essentially identical.

According to a preferred embodiment of the present invention, the difference between the first, second, and third sets 1010, 1020, and 1030 lies in the timing. For example, when comparing a negative transition of the first control signal 1012 from the first set 1010 with the same transition of a first control signal 1022 from the second set, it is evident that there is a delay (illustrated as highlight 1015). A similar delay (illustrated as highlight 1025) is present between the second and the third sets 1020 and 1030. It is these delays that allow the early, on-time, and late correlators/integrators to maximize the received signal strength.

According to a preferred embodiment of the present invention, a preferred amount of delay is approximately equal to one-half of the pulse's duration, although the delay can be varied. A delay that is too small does not result in a significant change in the received signal strength because the correlation and integration performed by the various correlators/intergrators occur too closely together. At the other extreme, if the delay is too large, the correlators/integrators may be detecting different pulses or portions of different pulses.

Figure 11:
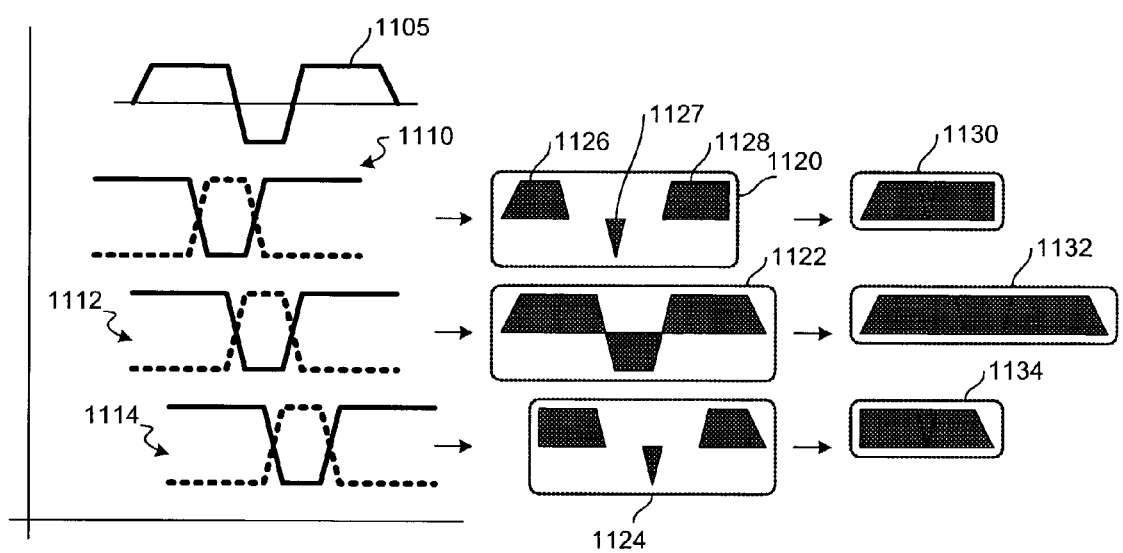
FIG. 11 is a series of diagrams of the timing of the early, on-time, and late correlators/integrators and how the timing affects the correlation value produced by the correlators/integrators, according to a preferred embodiment of the present invention.

With reference now to FIG. 11, there is shown a diagram illustrating the effect of timing of the control signals on the values produced by the early, on-time, and late correlators/integrators (for example, correlators/integrators 805, 810, and 815 (FIG. 8)), according to a preferred embodiment of the present invention. FIG. 11 illustrates a signed curve 1105 that is representative of a single Gaussian pulse being received at an UWB receiver. Immediately below the signed curve 1015 are three curves 1110, 1112, and 1114. The three curves 1110, 1112, and 1114 illustrate the control signals for the early, on-time, and late correlators/integrators.

Adjacent to the three curves 1110, 1112, and 1114 that are representing the control signals is an initial set of three groups of blocks 1120, 1122, and 1124. The initial set of three groups of blocks 1120, 1122, and 1124 represent portions of the signed curve 1105 that are active when corresponding control signals are active. The shaded blocks, for example, blocks 1126, 1127, and 1128, can be thought of as the intersection of the signed curve 1105 with the curve 1110. Note that due to the misalignment between the signed curve 1105 and the curve 1110, large portions of the signed curve 1105 and the curve 1110 do not intersect. Notice that the blocks in the set 1122 are significantly larger than the blocks in the sets 1120 and 1124. This is due to the proper alignment of the signed curve 1105 and the curve 1112.

Finally, there is a second set of three groups of blocks 1130, 1132, and 1134. These groups of blocks is simply the addition of the blocks in the initial set of three groups of blocks 1120, 1122, and 1124 and represents the total current seen by a capacitor that accumulates a charge in the respective correlators/integrators. Note that the more current seen by the capacitor, a larger charge is accumulated on the capacitor. Therefore, the value generated by the corresponding correlator/integrator is greater in magnitude.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An ultra-wideband (UWB) receiver comprising:
    a signal input;
    a filter and amplifier unit (FAU) coupled to the signal input, the FAU containing circuitry to eliminate interferers and amplify a signal provided by the signal input to generate an input signal having a pulse with a specified magnitude;
    a self-adjusting pulse detector coupled to the FAU, the self-adjusting pulse detector comprising a plurality of correlation circuits operable to correlate the pulse with a desired signal at different times from each other, the self-adjusting pulse detector containing circuitry to select an output signal from one of the plurality of correlation circuits having a highest relative correlation value; and
    a baseband processor coupled to the self-adjusting pulse detector, the baseband processor containing circuitry to equalize and decode a data stream in the selected output signal provided by the self-adjusting pulse detector.

2. The UWB receiver of claim 1, wherein the signal is a stream of finite duration pulses.

3. The UWB receiver of claim 1, wherein the self-adjusting pulse detector comprises:
    each correlation circuit comprising a correlator/integrator coupled to the signal input, each correlator/integrator containing circuitry to correlate the input signal with the desired signal and to generate a correlation value based on the correlation, wherein each correlator/integrator is configured to commence operation at a different time; and
    a comparator having a plurality of inputs, with each input coupled to an output from one of the correlator/integrators, the comparator to select a maximum input from the plurality of inputs.

4. The UWB receiver of claim 3, wherein there are three correlator/integrators in the self-adjusting pulse detector.

5. The UWB receiver of claim 3, wherein the signal is a stream of finite duration pulses, and wherein each correlator/integrator comprises a capacitor that is reset after each finite duration pulse.

6. The UWB receiver of claim 1 further comprising a rake receiver coupled between the self-adjusting pulse detector and the baseband processor, and operable to combine reflections of the signal input arriving at the UWB receiver at different times.

7. The UWB receiver of claim 1 further comprising a media access control (MAC) coupled to the UWB receiver and operable to manage and/or maintain communications to and/or from the UWB receiver.

8. The UWB receiver of claim 3, wherein the correlator/integrators further comprise:
    circuitry operable to determine a magnitude of both positive and negative pulses in the signal input; and
    a magnitude comparator operable to compare the magnitudes and select the larger of the values.

* * * * *